United States Patent [19]

Fisher et al.

[11] Patent Number: 4,940,892
[45] Date of Patent: Jul. 10, 1990

[54] OPTICAL DISCONTINUITY MONITOR SYSTEM

[75] Inventors: David W. Fisher, Schuylkill Haven; Eric T. Frishkorn, Harrisburg, both of Pa.

[73] Assignee: AMP Incorporated, Harrisburg, Pa.

[21] Appl. No.: 333,513

[22] Filed: Apr. 5, 1989

[51] Int. Cl.$^5$ ............................................. H01J 5/16
[52] U.S. Cl. ........................ 250/227.24; 356/73.1
[58] Field of Search ............... 250/227; 350/96.29; 356/73.1

[56] References Cited

U.S. PATENT DOCUMENTS

| 4,468,117 | 8/1984 | Hartovni et al. | 356/73.1 |
| 4,606,632 | 8/1986 | Hillerich | 356/73.1 |
| 4,654,580 | 3/1987 | Keller . | |
| 4,741,616 | 4/1988 | So et al. | 356/73.1 |
| 4,749,247 | 6/1988 | Large | 356/73.1 |

Primary Examiner—David C. Nelms

[57] ABSTRACT

A system for monitoring discontinuities in optical power transmitted through a fiber optic connector subjected to environmental stress is disclosed. Discontinuity events are defined in terms of amplitude and duration. The monitoring system comprises a detector unit, a fiber optic interface unit and a discontinuity monitor. The detector unit converts the optical signal supplied by the fiber optic connector to electronic form. The fiber optic interface unit determines the amplitude of discontinuities and the discontinuity monitor determines the duration of discontinuities.

9 Claims, 4 Drawing Sheets

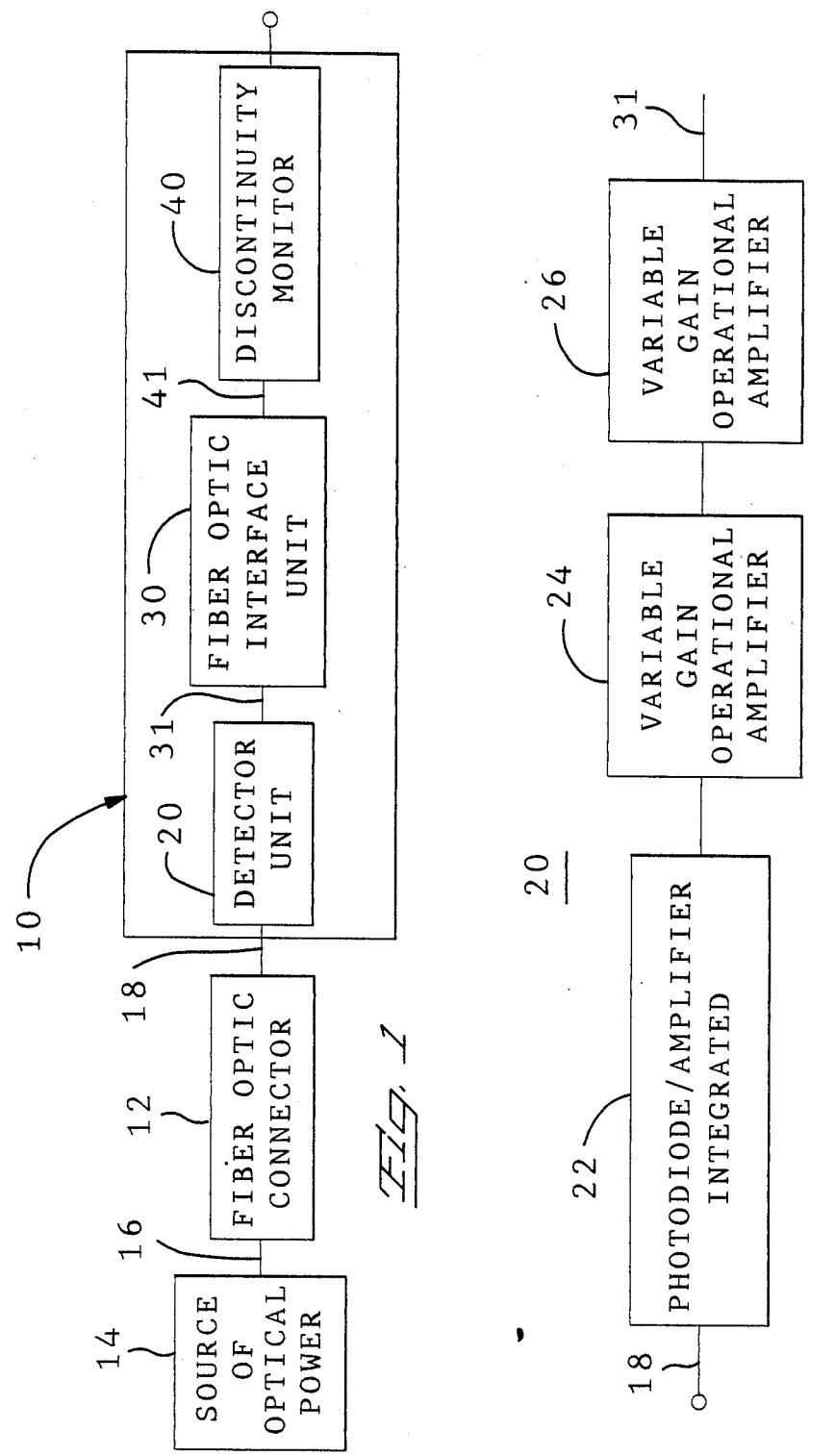

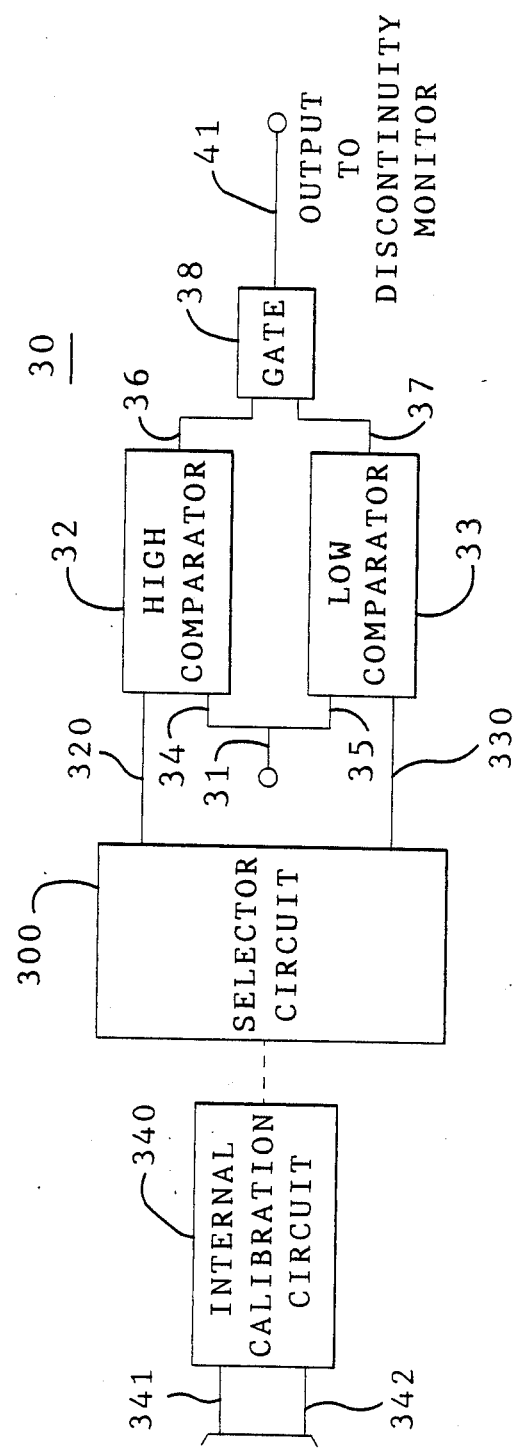

OPTICAL DISCONTINUITY MONITOR SYSTEM

FIELD OF THE INVENTION

The present invention relates to a system for monitoring discontinuities or transient fluctuations in the optical power transmitted through fiber optic connectors exposed to an environmental stress.

BACKGROUND OF THE INVENTION

Fiber optic connectors are utilized to couple optical radiation from an incoming optical fiber to an outgoing optical fiber with the highest possible coupling efficiency. Ideally, the coupling efficiency does not change with time. An unchanged coupling efficiency means that if a constant amplitude light signal is transmitted to the connector via the incoming optical fiber, a constant amplitude light signal, reduced in amplitude only by the losses produced during transmission of the signal through the connector itself, will be transmitted away from the connector via the outgoing fiber.

However, in many applications, including military applications, a fiber optic connector will be subjected to an environmental stress. Such as, vibrations or shock. The environmental stress generally causes fluctuations in the optical power transmitted through the connector.

The fluctuations in transmitted optical power may be characterized utilizing two parameters, amplitude and duration. For example, a particular type of fluctuation may define a discontinuity event in which the optical power transmitted by a connector exceeds a high power limit or falls below a low power limit for a specified time duration. For example, a discontinuity event may be defined by a fluctuation of optical power through a fiber optic connector in which the transmitted power deviates from a reference power level by at least 0.5 dB for at least 1 second.

It is important to be able to characterize the performance of various fiber optic connectors when they are subjected to various types of environmental stresses. One way of characterizing a fiber optic connector is to determine whether particular types of discontinuity events, suitably defined in terms of amplitude and duration, occur in the presence of certain environmental stresses. For example, in military applications, only a relatively small number of suitably defined discontinuity events can be tolerated in a fiber optic connector. A need exists for examination of a connector for detection of discontinuity events, thereby to determine if the connector is suitable for military applications.

Accordingly, it is an object of the present invention to provide an apparatus and method for detecting suitably defined discontinuity events when a fiber optic connector is subjected to environmental stress.

SUMMARY OF THE INVENTION

An apparatus for detecting suitably defined discontinuity events when a fiber optic connector is subjected to environmental stress comprises, a detector unit, a fiber optic interface unit, and a discontinuity monitor.

The detector unit detects the optical signal transmitted by the optical fiber leaving the fiber optic connector. The detector unit comprises an optical to electronic converter and a number of variable gain operational amplifier stages. The amplifier gains are chosen by an operator of the apparatus so that in the absence of fluctuations or discontinuities in the optical power transmitted through the fiber optic connector, the output of the detector unit is a constant reference voltage such as one volt.

The fiber optic interface unit provides the amplitude component of the discontinuity event definition. As indicated above, in the absence of fluctuations or discontinuities in the optical power transmitted by the fiber optic connector, the fiber optic interface unit receives a constant reference voltage signal from the detector unit.

When the connector under test is subjected to an environmental stress so as to produce fluctuations in the transmitted optical power, these fluctuations will show up in the voltage signal transmitted between the detector unit and the fiber optic interface unit as deviations from the constant reference voltage. The fiber optic interface unit monitors the signal from the detector unit, and determines if any deviations from the reference voltage exceed predetermined high or low voltage limits. For example, the high voltage limit may be 0.5 dB above the reference voltage and the low voltage limit may be 0.5 dB below the reference voltage. The high and low voltage limits are selectable, for example, from 0.5, 1, 2, or 3dB in order to detect variously defined discontinuity events.

The fiber optic interface unit outputs square wave pulses whose widths are coextensive in time with any deviations from the reference voltage that are above the high voltage limit or below the low voltage limit. Thus, the fiber optic interface unit detects any fluctuations that satisfy the amplitude component of the discontinuity event definition.

The durational component of the discontinuity event definition is provided by the discontinuity monitor. The discontinuity monitor measures the duration of each square wave pulse received from the fiber optic interface unit and thereby detects fluctuations having sufficient amplitude and having a duration greater than a predetermined duration such as 1 second. Thus, the net result of the processing by the fiber optic interface unit and the discontinuity monitor is to detect fluctuations or discontinuity events having an amplitude greater than a particular predefined amplitude and a duration greater than a particular predefined duration.

For example, the discontinuity monitor utilizes LEDs to indicate its output. For example, a green LED indicates a 0.1 micro second discontinuity, a yellow LED indicates a 1 micro second discontinuity and red LED indicates a 10 micro second discontinuity.

Preferably a plurality of connector testing stations, each comprising a detector unit, a fiber optic interface unit, and a discontinuity monitor are packaged together in a single housing to enable testing of a plurality of fiber optic connectors at the same time.

These and other subjects and advantages of the invention are useful separately in the invention described by way of example.

BRIEF DESCRIPTION OF THE DRAWING

FIG. 1 schematically illustrates an optical discontinuity monitoring system in accordance with an illustrative embodiment of the resent invention.

FIG. 2 schematically illustrates a detector unit for use in the discontinuity monitoring system of FIG. 1.

FIG. 3 schematically illustrates a fiber optic interface unit for use in the discontinuity monitoring system of FIG. 1.

DETAILED DESCRIPTION OF THE INVENTION

Figure 4:
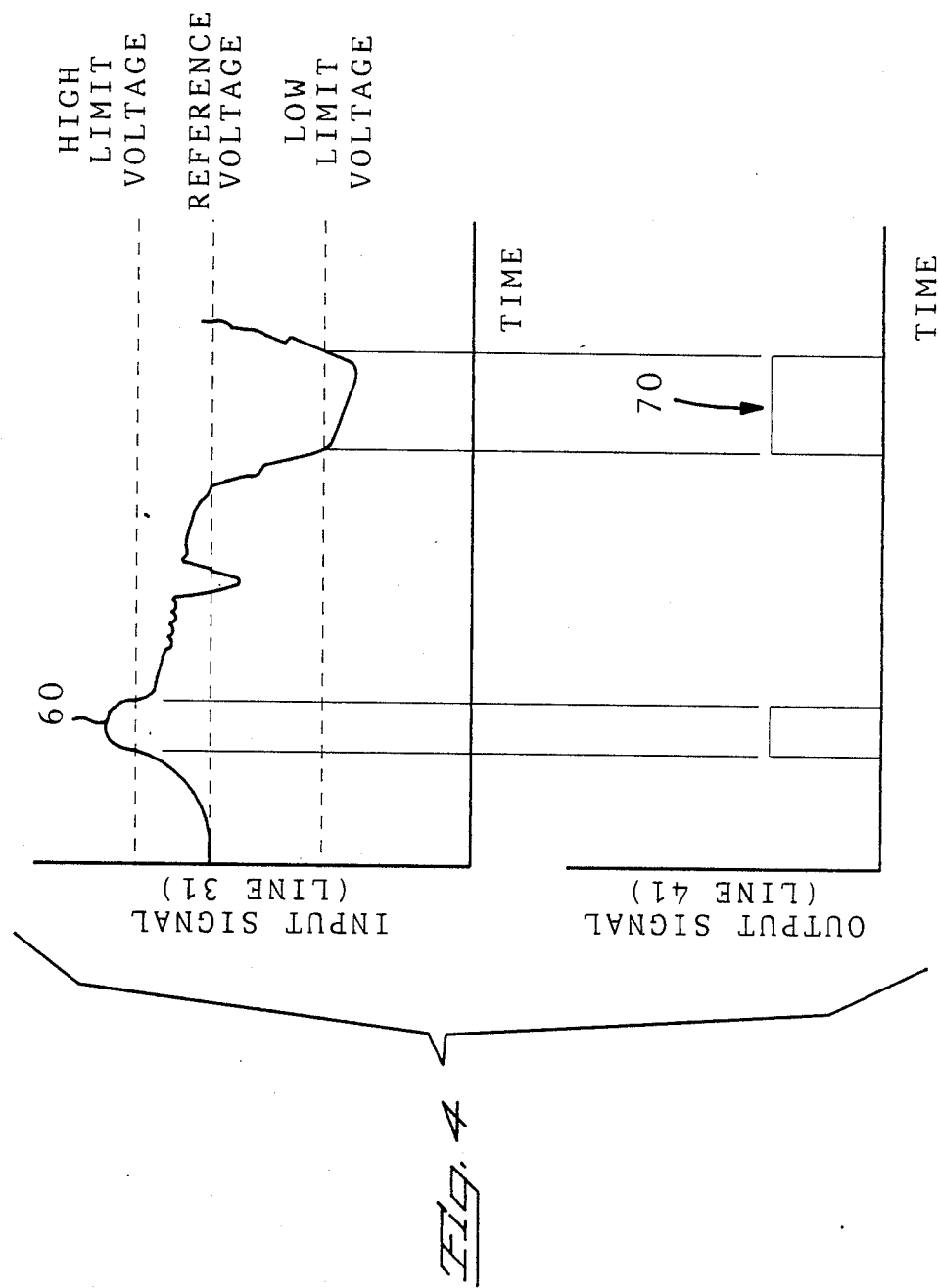
FIG. 4 graphically illustrates the input signal to Fiber Optic Interface and its corresponding output.

Turning to FIG. 1, a fiber optic connector 12 is schematically illustrated. The purpose of the connector 12 is to couple optical power transmitted from the source 14 via an incoming optical fiber 16 to an outgoing optical fiber 18. A variety of such fiber optic connectors are known to those skilled in the art. A typical connector includes a first connector plug or ferrule member which is attached to the end of the incoming optical fiber, a second connector plug or ferrule member which is attached to the end of the outgoing optical fiber, and a coupling bushing or housing which disconnectively receives the two plugs. Each connector plug includes a ferrule having a bore through which its optical fiber passes. Further details of the connector are disclosed in U.S. Pat. 4,614,402.

The source 14 produces optical power at a constant power level. Aside from losses intrinsic to the connector itself, this optical power is transmitted through the connector 12 from the incoming fiber 16 to the outgoing fiber 18. Thus, in the absence of environmental stress, the fiber optic connector 12 transmits optical power at a constant level into the fiber 18. However, when the connector 12 is subjected to environmental stress such as shock or vibration, there are fluctuations and discontinuities in the optical power transmitted by the connector 12 into the fiber 18.

The system 10 serves to monitor fluctuations and discontinuities in the optical power transmitted by the connector 12 as it is subjected to various environmental stresses. This allows a comparison to be made between various types of connectors to determine which ones are most suitable for specific applications. In particular, for military applications, a relatively limited number of suitably defined discontinuities can be tolerated at relatively high levels of environmental stress.

The monitoring system 10 comprises a detector unit 20, a fiber optic interface unit 30 and a discontinuity monitor 40. The detector unit 20 converts the optical power transmitted by the outgoing fiber 18 into an electronic signal. In particular, in the absence of fluctuations in the optical power transmitted by the connector 12, the detector unit 20 outputs on line 31 a constant reference voltage such as 1 volt. Fluctuations in the optical power transmitted by the connector 12 show up as voltage fluctuations around the reference voltage at the output of the detector unit 20.

The fiber optic interface unit 30 and the discontinuity monitor 40 determine whether particular fluctuations meet predetermined values of selected amplitude and duration. Thus, the fiber optic interface unit 30 compares deviations from the reference voltage level with high and low voltage limits, and outputs a square wave pulse whenever the signal received from the detector unit exceeds the high voltage limit or falls below the low voltage limit. The duration of the square wave pulse corresponds to the duration for which the input signal received from the detector unit 30 exceeds the high voltage limit, or alternatively falls below the low voltage limit.

The square wave pulses from the fiber optic interface 30 are transmitted to the discontinuity monitor via the line 41. The discontinuity monitor 50 measures the duration of each square wave pulse and indicates when a square wave pulse exceeds a predefined duration.

In this manner both the amplitude and duration components of a discontinuity event definition are accounted for.

The detector unit 20 is illustrated in greater detail in FIG. 2. The optical signal carried by the fiber 18 is received and converted to electronic form by a photodiode/amplifier integrated circuit 22. Illustratively, the integrated circuit 22 is a unit HFD1100 available from EG&G, Photon Devices, 35 Congress Street, Salem, Mass. 01970-6526. The output of the integrated circuit 22 is then passed to two variable gain operational amplifier stages 24 and 26. Illustratively, the amplifier stages are model number AD509 high speed amplifiers available from Analog Devices, P.O. Box 280, NorWood, Mass. 02062. Two amplifier stages are utilized because in general it is not possible to obtain sufficient amplification from one amplifier stage without distortion. The net gain of the amplifier stages 24, 26 is adjusted so that in the absence of fluctuations in the optical power transmitted by the connector 12 (see FIG. 1), the signal on line 31 is a constant 1 Volt signal.

The fiber optic interface unit 30 is illustrated in greater detail in FIG. 3. The input signal from the detector unit 20 arrives at the fiber optic interface unit 30 via line 31. The input signal is fed to two comparators 32 and 33 via lines 34 and 35, respectively. The comparator 32 compares the input signal with a high voltage limit and the comparator 33 compares the input signal with a low voltage limit. The output of the comparator 32 is high whenever the input signal exceeds the high voltage limit. The output of the comparator 33 is high whenever the input signal falls below the low voltage limit. Thus, the comparator 32 outputs on line 36 a sequence of square wave pulses whose durations correspond to the time periods for which the input signal exceeds the high voltage limit and the comparator 33 outputs on line 37 a sequence of square wave pulses whose durations correspond to the time periods for which the input signal falls below the low voltage limit.

The square wave pulses produced by the comparators 32,33 on lines 36,37 are combined by the gate 38 and transmitted via line 41 to the discontinuity monitor. A pulse from comparator 32 never coincides with a pulse from comparator 33 since the input signal can never simultaneously exceed the high voltage limit and fall below the low voltage limit.

The high and low voltage limits are chosen via the selector circuit 30 and communicated to the comparators 32,33 via the lines 320,330. For example, the high and low voltage limits may be chosen to be 0.5, 1.0, 2.0 or 3.0dB above and below the 1 Volt reference voltage produced by the detector unit 20 (see FIG. 1) when there are no fluctuations in the optical power transmitted by the connector 12. The fiber optic interface 30 includes an internal calibration circuit 340 which aids in checking the operation of the fiber optic interface 30 and the discontinuity monitor 40. The calibration circuit 340 receives input signals from the discontinuity monitor 40 via line 341 and transmits output signals to the discontinuity monitor via line 342. A fiber optic interface of the type shown in FIG. 3 has been manufactured as model number FOI6-IV-S, by Associated Testing Laboratories, Inc., Northwest Industrial Park, Burlington, Massachusetts.

FIG. 4 illustrates the amplitude of the input signal 60 received at the fiber optic interface unit 30 on line 31 from the detector unit 20 as a function of time. FIG. 4 also shows the reference voltage produced by the detector unit 20 in the absence of fluctuations in the optical power transmitted through the fiber optic connector 12, the high voltage limit used by the comparator 32 and the low voltage limit used by the comparator 33. The output signal 70 on line 41 is also shown in FIG. 4. In particular, FIG. 4 shows two square wave pulses with different durations. The first pulse has a duration corresponding to a time interval wherein the input signal exceeds the high voltage limit and the second pulse has a duration corresponding to a time interval wherein the input signal falls below the low voltage limit.

The duration of each of these square wave pulses is measured by the discontinuity monitor 40. The discontinuity monitor 40 is available as model number DM600-10 from Associated Testing Laboratories, Inc. The measured duration may be indicated by LEDs. For example, a green LED represents a 0.1 micro second discontinuity, a yellow LED represents a 1 micro second discontinuity and a red LED represents a 10 micro second discontinuity. Longer discontinuities may be indicated by simultaneously illuminating two of the LEDs.

Figure 5:
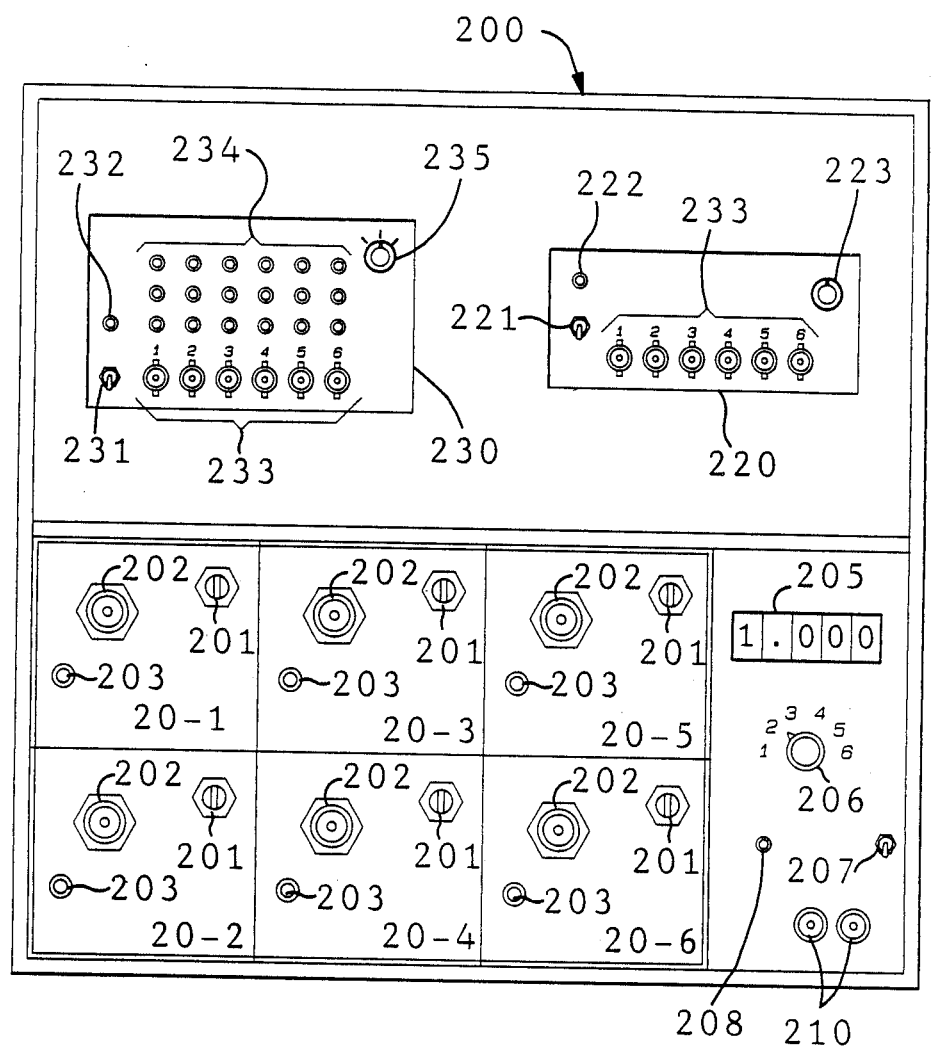
FIG. 5 schematically illustrates the front panel of a unit which contains a plurality of discontinuity monitoring systems of the type shown in FIG. 1.

Typically, a plurality such as six of the monitoring systems 10 of FIG. 1 are packaged in a single housing so that up to six connectors may be simultaneously tested when subjected to a particular environmental stress. In this way, it is possible to accurately compare the performance of different detectors under particular stress conditions. The front panel 200 of such a combined monitoring system is shown in FIG. 5. The front panel 200 includes six detector units of the type shown in FIG. 2 which are labelled 20-1, 20-2, 20-3, 20-4, 20-5, and 20-6 in FIG. 5. Each of the detector units 20-1, 20-2, 20-3, 20-4, 20-5, 20-6 includes a means 201 for adjusting the output of the detector unit to 1 Volt in the absence of fluctuations in the power transmitted through the corresponding connector 12 (see FIG. 1). An active device mount 202 is provided for receiving optical power from the corresponding connector 12. The active device mount 202 is commercially available as part number 501184-1 from AMP Incorporated, Harrisburg, PA catalog number 83-718. An adjustment means 203 in the form of a potentiometer is provided for zeroing the voltage to correspond to 1 volt at the dark current, i.e., in the absence of light coupled to the active device mount from the connector.

The panel 200 also includes a voltmeter 205 which can measure and indicate the voltage output of any of the detector units 20-1 . . . 20-6. A dial switch 206 is provided to connect the voltmeter 205 to the output of anyone of the six detector units. The front panel 200 also includes a toggle switch 207 for connecting an disconnecting electrical power to the combined monitoring system and an LED, Light Emitting Diode, 208 which lights up when power is applied. Two standard RCA banana plugs 210 are provided so that an external voltmeter may be utilized to measure the output of any of the detector units.

The means for accessing and controlling the six fiber optic interface units 30 (see FIGS. 1 and 3) which are incorporated in the combined monitoring system of FIG. 5 is collectively labeled 220. Power may be applied to the fiber optic interface units via the toggle switch 221 and this power causes the LED 222 to light up. The switch 223 is used to set the high and low voltage limits. Not shown in FIG. 5 are the connectors for receiving the input signals from the detectors unit 20-1, 20-2 . . . 20-6 and the means for receiving calibration signals from the discontinuity monitor and for transmitting calibration signals to the discontinuity monitor. The connectors 223 supply the output signals of the fiber optic interface units.

The means for accessing and controlling the six discontinuity monitors (see FIG. 2) which are incorporated into the combined monitoring system of FIG. 5 is collectively designated 230 in FIG. 5. Power is applied to the discontinuity monitors via the toggle switch 231 and the presence of power is indicated by the LED 232. Signals from the fiber optic interface units are received via the connectors 233. Three LEDs for each of the six channels are used to indicate the occurrence of discontinuity events of various durations. These LEDs are collectively designated 234 in FIG. 5. The durations may be set by means of the switch 235. Not shown in FIG. 5 are switches for controlling the testing and calibration of the discontinuity monitor as well as switches for selectively tuning off individual ones of the six channels.

We claim:

1. A system for monitoring optical power transmitted through a fiber optic connector subjected to environmental stress comprising:
    converting means for converting fluctuations in the optical power transmitted through said connector into a fluctuating electronic signal,
    comparison means for determining when said electronic signal exceeds a high voltage limit or falls below a low voltage limit and for producing output signals indicative of the time periods for which said electronic signal exceeds said high voltage limit or falls below said low voltage limit, and
    duration measuring means responsive to said output signals for determining if said electronic signal exceeds said high voltage limit or falls below said low voltage limit for a time period having a duration in excess of a predetermined duration.

2. The system of claim 1 wherein said converting means comprises an optical to electronic converter for converting the optical signal transmitted by said connector into an electronic signal and variable gain amplification means, the gain of said variable gain amplification means being adjusted so that in the absence of said environmental stress said electronic signal is in the form of a constant reference voltage.

3. The system of claim 2 wherein fluctuations in the optical power transmitted through said connector when said monitor is subjected to environmental stress are indicated by said electronic signal as fluctuations about said constant reference voltage.

4. The system of claim 3 wherein said comparison means produces a square Wave pulse whenever said electronic signal exceeds a high voltage limit or falls below a low voltage limit.

5. The system of claim 4 wherein said duration measuring means provides a visual indication when the duration of one of said square wave pulses exceeds a predetermined duration.

6. The system of claim 5 wherein a plurality of said systems are combined to form single unit for monitoring the optical power transmitted through a plurality of fiber optic connectors.

7. In combination,
a fiber optic connector subjected to an environmental stress, and
a system for monitoring fluctuations in the optical power transmitted through said connector, said system comprising
a detector unit for converting the optical signal transmitted through said connector into an electronic signal which indicates said fluctuations in optical power as voltage fluctuations about a constant reference voltage,
a fiber optic interface unit for outputting a square wave pulse when said electronic signal exceeds a high voltage limit or falls below a low voltage limit, and
a discontinuity unit for determining when one of said square wave pulses has a duration which exceeds a predetermined duration and for providing a visual indication thereof.

8. A method for monitoring optical power transmitted through a fiber optic connector subjected to environmental stress comprising the steps of
converting fluctuations in the optical power transmitted through said connector into a fluctuating electronic signal,
determining when said electronic signal exceeds a high voltage limit or falls below a low voltage limit and producing output signals indicative of the time periods for which said electronic signal exceeds said high voltage limit or falls below said low voltage limit, and
measuring said time periods indicated by said output signals to determine if said electronic signal exceeds said high voltage limit or falls below said low voltage limit for a time period having a duration in excess of a predetermined time period.

9. A method for testing a fiber optic connector comprising the steps of:
subjecting said fiber optic connector to an environmental stress, and
monitoring fluctuations in the optical power transmitted through said connector, said monitoring step comprising the steps of
converting the optical signal transmitted through said connector into an electronic signal which indicates said fluctuations in optical power as voltage fluctuations about a constant reference voltage,
outputting a square wave pulse when said electronic signal exceeds a high voltage limit or falls below a low voltage limit,
measuring the duration of said square wave pulses to determine when a square wave pulse has a duration which exceeds a predetermined duration, and
providing a visual indication when a square wave pulse has a duration which exceeds a predetermined duration.

* * * * *